Patented Feb. 17, 1931

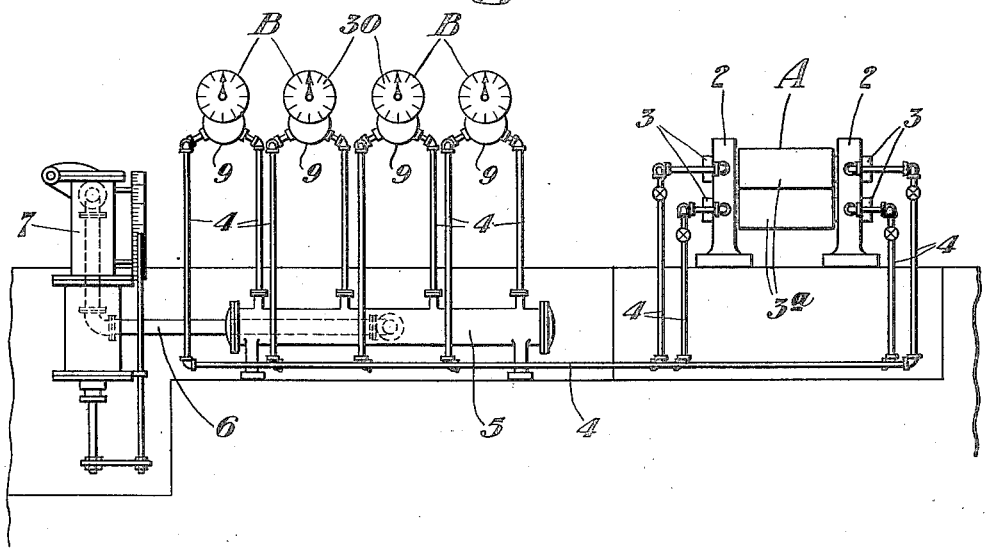
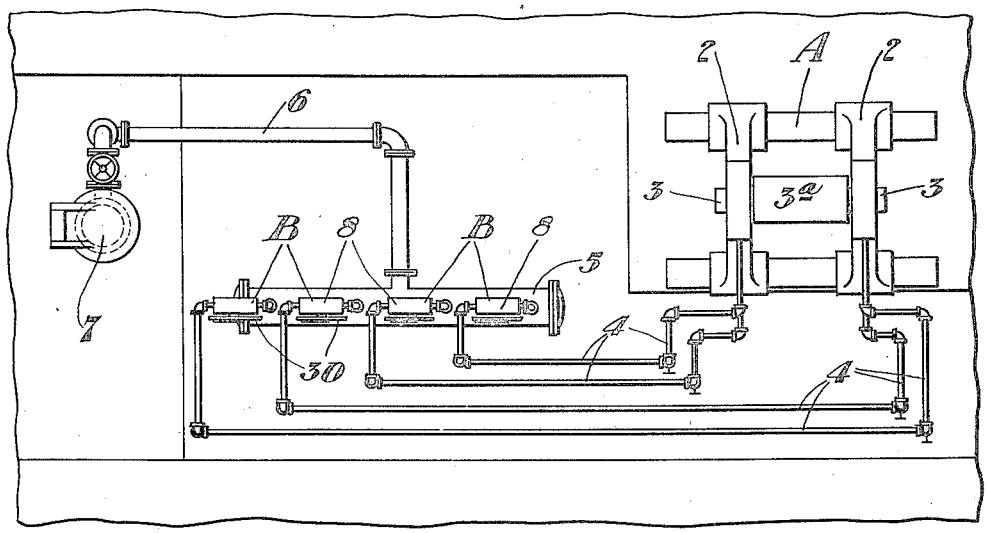

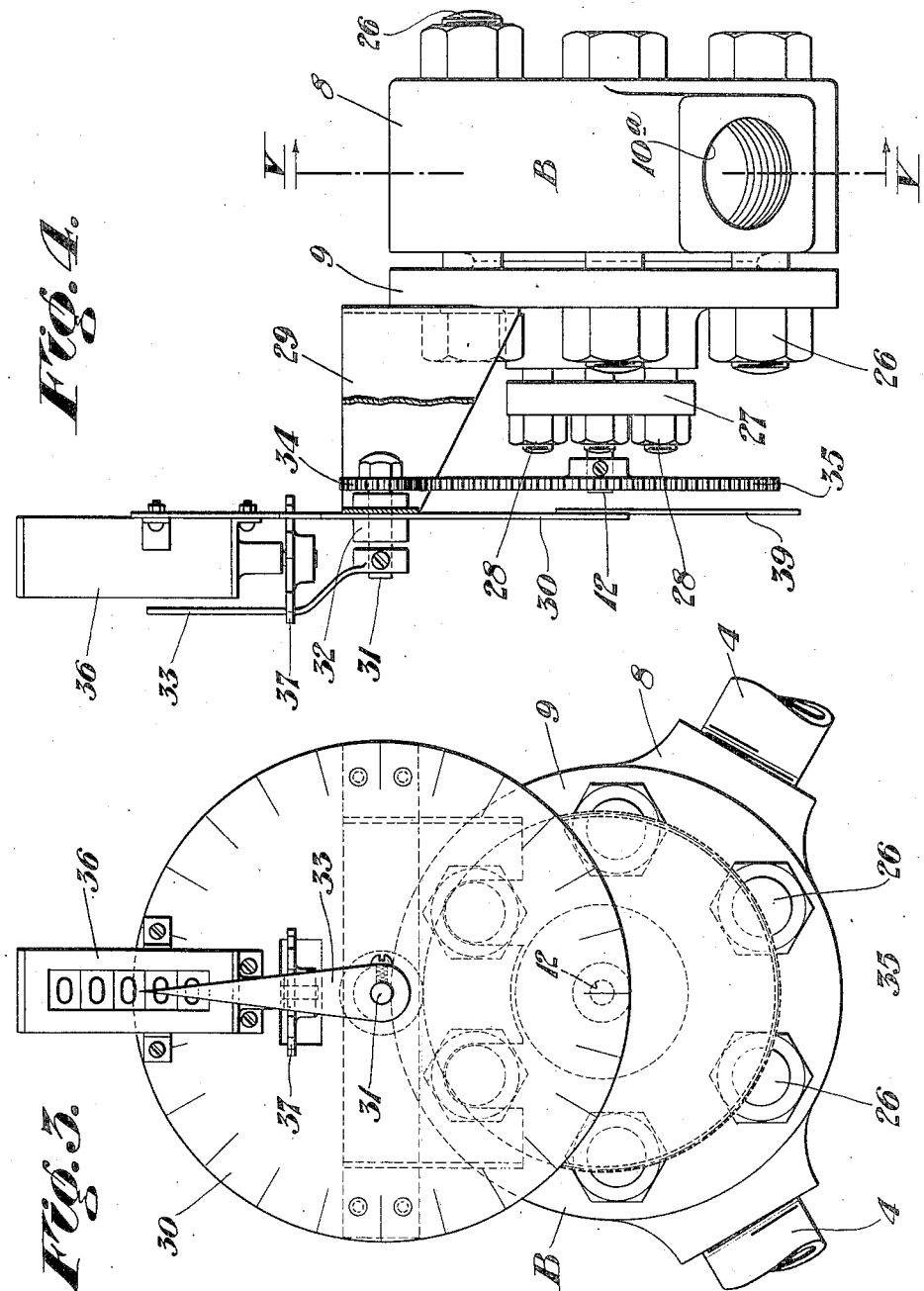

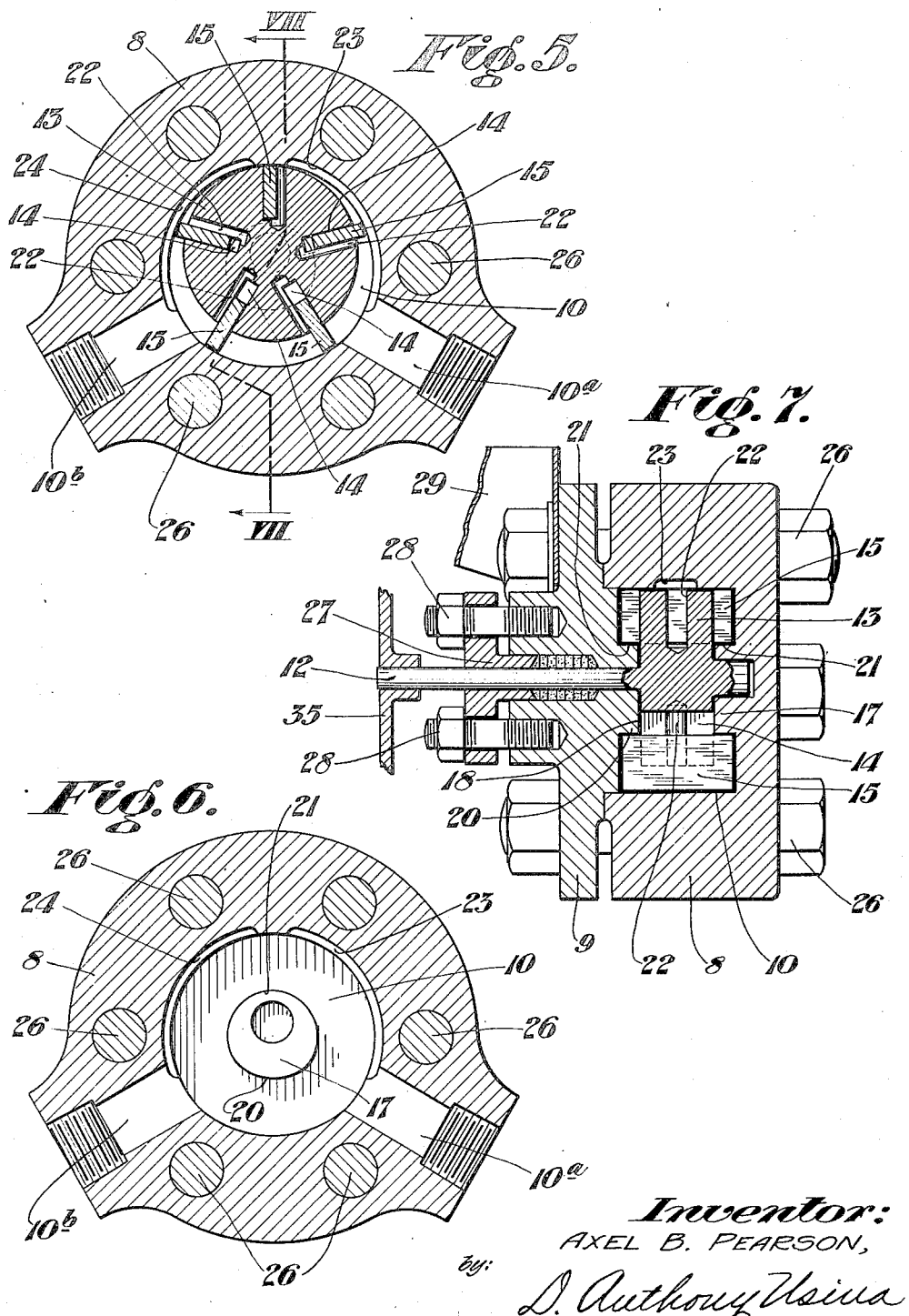

1,793,007

UNITED STATES PATENT OFFICE

AXEL B. PEARSON, OF HOMESTEAD PARK, PENNSYLVANIA

LUBRICANT-FLOW METER

Application filed March 23, 1928. Serial No. 264,085.

This invention relates to flow meters and more particularly to a flow meter adapted to indicate and register the flow of a heavy lubricant, such as grease, through a conduit.

The lubricating of the roll neck bearing of a rolling mill and other heavy duty bearings by force feed lubricating systems has generally failed, due to the fact that it was impossible to know how much, if any, grease or lubricant passed through the conduit to the individual bearings. Also, if the grease or lubricant became exhausted, the danger of ruining the bearings because of the lack of lubricant was always present.

Heretofore, no flow meter or indicator was known that would properly and unfailingly record the flow of a heavy lubricant, such as grease, through a conduit. Therefore, the present indicator or meter was devised particularly to indicate or register the rate as well as the amount of flow of heavy lubricant through a conduit, regardless of variations in pressure of the lubricant which may vary from a few ounces to several thousand pounds per square inch.

In the drawings—

Figure 1 is an elevation showing a stand of rolls equipped with lubricating apparatus including this invention.

Figure 2 is a plan of the same.

Figure 3 is a front elevation of an indicator or meter constructed in accordance with this invention.

Figure 4 is a side elevation thereof.

Figures 5 and 6 are sectional elevations taken on the line V—V of Figure 4, the rotor being omitted from Figure 6.

Figure 7 is a sectional elevation taken on the line VII—VII of Figure 5.

Referring more particularly to the drawings, the letter A designates a stand of rolling mill rolls as a whole, which is composed of the usual housing members 2 in which the necks 3 of the rolls 3ª are journaled in suitable bearings (not shown).

The roll necks are adapted to be automatically lubricated by a heavy lubricant or grease which is delivered to the roll necks and their bearings through conduits 4, one of which is provided for each individual roll neck. The conduits 4 are all connected to a lubricant supply manifold 5 and are provided intermediate their ends with individual flow indicators or meters B adapted to indicate the flow of the lubricant through the individual conduits to the roll necks, and to register the total flow through the conduits.

The manifold 5 is adapted to be supplied with lubricant under constant pressure through a supply line 6 leading from a fluid pressure lubricant supply cylinder 7.

The indicators or meters B are particularly adapted for operation with heavy lubricant such as grease although their use is in nowise limited to such material since they will work equally as well with a fluid, semi-fluid, or semi-solid lubricant.

The indicators or meters B comprise a housing composed of a body portion 8 and a cover-plate 9. The housing is cut away to form a cylindrical rotor chamber 10 which is closed by the cover-plate 9. The housing 8 is provided with inlet and outlet openings 10ª and 10ᵇ communicating with the rotor chamber 10 at spaced points in its periphery and to which the conduit 4 is connected. A rotor-shaft 12 is journaled in the housing in a position eccentric to the center of the rotor chamber 10, and a cylindrical rotor 13 is fixedly mounted concentrically on the shaft 12. The rotor is of such diameter that it will, due to the eccentric mounting of the rotor-shaft, have a sliding contact with a portion of the peripherial wall of the rotor chamber 10 nearest said rotor-shaft.

The rotor 13 is provided with a plurality of transverse diametrically arranged slots 14 in which are slidably or loosely mounted substantially rectangular blades or paddle-members 15 which project materially beyond each side face of the rotor.

A pair of substantially curved projecting cam-members or limbs 17 and 18 are provided, one on the back face of the rotor chamber and one on the inner face of the cover plate 9. The cam-members 17 and 18 are formed with the segments of their peripheries opposite the space between the inlet and outlet openings of the rotor chamber concentric with the center of the rotor 13, while the remaining portion 21 of their peripheries are concentric with the center of the rotor chamber. The peripheries of the members 17 and 18, as a whole, are spaced from the periphery of the rotor chamber 10 a distance equal to the width of the blades 15 so as to form a path for such blades. By forming the peripheries of the cam-members 17 and 18, as above described, the blades 15 are caused to positively move in and out of the slots 14 when the rotor 13 is rotated, since the periphery of the rotor chamber will force the blades into the slot as the rotor approaches the narrow part of its path of travel and the cams 17 and 18 will compel said blades to move out or remain in contact with the periphery of the rotor chamber 10 as the rotor approaches the wider part of its path of travel. Due to the segment 20, of the cams opposite the portion of the rotor chamber beween the inlet and outlet ports or openings being concentric with the center of the rotor 13, the blades will have no radial movement during their travel between the inlet and outlet ports.

A radial relief groove 22 is formed in one side wall of each of the slots 14 to permit the free passage of the lubricant into and out of the slots 14 as the blades 15 are moved into and out of the slots during rotation of the rotor 13. Other relief grooves 23 and 24 are provided in the peripherial wall of the rotor chamber 10. The groove 23 extends from the inlet opening 10$^a$ around the periphery of the rotor chamber 10 to a point adjacent the point where the rotor member 13 is closest to the peripherial wall of the rotor chamber, and the groove 24 extends from the outlet opening 10$^b$ around the periphery of the rotor chamber 10 to a point adjacent the point where the rotor member 13 is closest to the peripherial wall of the rotor chamber. The relief grooves 23 and 24 are adapted to permit the lubricant to flow from or into the spaces back of the paddles as required during the rotation of the rotor.

The cover-plate 9 is secured in position by bolts 26, and the end of the rotor-shaft 12, which is journaled in said cover, projects materially therebeyond. A stuffing box and gland assembly 27 are secured around the projecting end of the shaft 12 by bolts 28 to prevent the escape of the lubricant around said shaft.

A bracket 29 is secured to the cover-plate 9 by two of the bolts 26 and projects materially beyond the stuffing box assembly 27 so as to provide a mounting for a dial-plate 30. A short shaft 31 is journaled in a bearing 32 in the center of the dial-plate 30 and has an indicating hand or pointer 33 secured to its end which projects beyond the dial-plate 30, while its other end is provided with a pinion 34 which is in mesh with a large diameter driving-gear 35 secured on the projecting end of the rotor-shaft 12.

A standard counter-mechanism 36 is secured to the upper portion of the dial plate 30 and is provided with a trip-wheel 37 which projects into the path of the hand 33 so that at each revolution of the hand 33 the counter will be tripped, thus registering the number of revolutions of the hand 33 over any given time.

A shield-plate 39 is secured to the lower portion of the dial-plate 30 so as to shield and protect the gear 35.

In operation, the lubricant passes from the supply side of the conduit 4 through the inlet opening 10$^a$ and engages or is forced against the blades 15 and, due to the eccentric mounting of the rotor 13, the blades between the inlet and outlet ports 10$^a$ and 10$^b$ will be extended so as to present the greatest area or surface. Therefore, the lubricant will exert its greatest force against these blades and cause the rotor to rotate in a clockwise direction or from the inlet port toward the outlet port. As the rotor rotates, the lubricant will flow from behind or between the blades 15 through the outlet port and through the conduit 4 to the roll-housing. As the rotor is rotated, the blades 15 will be moved radially in the slots 14 and the lubricant will enter and leave the slots 14 by way of the grooves 22 and 23—24 so that there will be no binding of the blades due to packing of the lubricant in the blade slots 14, thus reducing the friction incident to the rotation of the rotor 13.

The eccentric mounting of the rotor 13, coupled with the cams which maintain the blades extended, compels the rotor to always rotate in the same direction, and the freedom of the structure from springs or other similar delicate parts adapts the device particularly for use in connection with rolling mills and similar places where it is subject to rough usages and with extremely high pressures.

While I have shown and described one specific form of my invention, it will be understood that I do not wish to be limited thereto since various modifications may be made without departing from the scope thereof as defined in the appended claims.

I claim—

1. A flow meter comprising a housing having a cylindrical rotor chamber and inlet and outlet openings communicating with said chamber, a rotor-shaft eccentrically journaled in said housing relative to said rotor chamber, a rotor fixed concentrically on said shaft and rotatable in said chamber, the eccentricity of said rotor-shaft being sufficient to cause said rotor to have a sliding fit with one point of the periphery of said rotor chamber intermediate said inlet and outlet openings, said rotor having a plurality of diametrically arranged transverse slots therein, blade-members slidably mounted in said slots, means for maintaining said blades in contact with the periphery of said rotor chamber when said rotor is rotated, said rotor having at least one diametrically extending relief groove in the side wall of each of said blade slots in said rotor to permit the free passage of the material being metered into and out of said slots and other relief grooves in the periphery of said rotor chamber to permit the material being metered to flow back of and out from in back of said blades as said rotor is operated, one of said last named grooves extending around the periphery of said rotor chamber from said inlet opening to a point adjacent the point of sliding fit of said rotor with the periphery of said rotor chamber, and the other of said last named grooves extending around the periphery of said rotor chamber from said outlet opening to a point adjacent the point of sliding fit of said rotor with the periphery of said rotor chamber.

2. A flow meter comprising a housing having a cylindrical rotor chamber and inlet and outlet openings communicating with said chamber, a rotor mounted in said chamber so as to have a sliding fit with one point of the periphery of said rotor chamber intermediate said inlet and outlet openings, said rotor having a plurality of diametrically arranged transverse slots therein, blade members slidably mounted in said slots, cam means for positively moving said blades diametrically relative to said rotor when said rotor is rotated so as to maintain said blades in contact with the periphery of said rotor chamber, said rotor having at least one diametrically extending relief groove in the side wall of each of said blade slots in said rotor to permit the free passage of the material being metered into and out of said slots and other relief grooves in the periphery of said rotor chamber to permit the material being metered to flow back of and out from in back of said blades as said rotor is operated, one of said last named grooves extending around the periphery of said rotor chamber from said inlet opening to a point adjacent the point of sliding fit of said rotor with the periphery of said rotor chamber, and the other of said last named grooves extending around the periphery of said rotor chamber from said outlet opening to a point adjacent the point of sliding fit of said rotor with the periphery of said rotor chamber.

In testimony whereof, I have hereunto set my hand.

AXEL B. PEARSON.